United States Patent
Fang et al.

(10) Patent No.: US 7,844,661 B2
(45) Date of Patent: Nov. 30, 2010

(54) COMPOSITION OF LOCAL MEDIA PLAYBACK WITH REMOTELY GENERATED USER INTERFACE

(75) Inventors: Nicholas J. Fang, Redmond, WA (US);
Todd Bowra, Redmond, WA (US);
Ashley C. Speicher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 11/454,020

(22) Filed: Jun. 15, 2006

(65) Prior Publication Data

US 2008/0034029 A1 Feb. 7, 2008

(51) Int. Cl.
*G06F 15/16* (2006.01)
(52) U.S. Cl. .................. 709/203; 709/231; 709/232
(58) Field of Classification Search .................. 709/203
See application file for complete search history.

(56) References Cited

U.S. PATENT DOCUMENTS

| | | | |
|---|---|---|---|
| 5,859,639 A | 1/1999 | Ebrahim | |
| 6,493,008 B1 | 12/2002 | Yui | |
| 6,518,985 B2 | 2/2003 | Ozcelik et al. | |
| 6,809,776 B1 | 10/2004 | Simpson | |
| 6,816,883 B2* | 11/2004 | Baumeister et al. | 709/203 |
| 6,839,071 B1 | 1/2005 | Miyamoto | |
| 7,168,086 B1 | 1/2007 | Carpenter et al. | |
| 7,313,591 B2* | 12/2007 | Eames et al. | 709/203 |
| 7,362,381 B1 | 4/2008 | Stahl et al. | |
| 2001/0026386 A1 | 10/2001 | Yamamoto et al. | |
| 2002/0111995 A1 | 8/2002 | Mansour et al. | |
| 2002/0138593 A1* | 9/2002 | Novak et al. | 709/219 |
| 2003/0097452 A1 | 5/2003 | Kim et al. | |
| 2003/0188321 A1 | 10/2003 | Shoff et al. | |
| 2003/0234811 A1 | 12/2003 | Kim | |
| 2004/0039834 A1* | 2/2004 | Saunders et al. | 709/231 |
| 2004/0078470 A1* | 4/2004 | Baumeister et al. | 709/227 |
| 2004/0103207 A1* | 5/2004 | Elman et al. | 709/231 |
| 2004/0177063 A1* | 9/2004 | Weber et al. | 707/3 |
| 2004/0267940 A1* | 12/2004 | Dideriksen et al. | 709/228 |
| 2004/0267952 A1* | 12/2004 | He et al. | 709/231 |
| 2005/0015712 A1* | 1/2005 | Plastina et al. | 715/500.1 |
| 2005/0138192 A1* | 6/2005 | Encarnacion et al. | 709/230 |
| 2005/0149639 A1 | 7/2005 | Vrielink et al. | |

(Continued)

OTHER PUBLICATIONS

Jain, Metadata in Video Databases, 1994, Sigmond Record, vol. 23. pp. 7.*

(Continued)

*Primary Examiner*—Firmin Backer
*Assistant Examiner*—Arvin Eskandarnia (57) ABSTRACT

A media server in a home entertainment network coordinates with a media player connected with the network to provide a media presentation with a combined user interface (UI) on an attached display device. Media content is sourced locally on a networked media player. The media player extracts metadata related to the media content and transmits the metadata to the media server. The media server creates the UI to include components related to the media content rendered by the media player. The media server then transmits the UI to the media player for combination with the rendered media content for a composite output to a presentation device. The media server may further develop and transmit compositing instructions and additional media content to the media player for inclusion in the composite output.

20 Claims, 6 Drawing Sheets

U.S. PATENT DOCUMENTS

| | | | |
|---|---|---|---|
| 2006/0020879 A1* | 1/2006 | Eames et al. | 715/500 |
| 2006/0069797 A1 | 3/2006 | Abdo et al. | |
| 2006/0080382 A1 | 4/2006 | Dutta et al. | |
| 2006/0174026 A1 | 8/2006 | Robinson et al. | |
| 2006/0224691 A1 | 10/2006 | Dutta et al. | |
| 2006/0230427 A1 | 10/2006 | Kunkel et al. | |
| 2007/0005727 A1 | 1/2007 | Edwards et al. | |
| 2007/0005783 A1 | 1/2007 | Saint-Hillaire et al. | |
| 2007/0005795 A1* | 1/2007 | Gonzalez | 709/232 |
| 2007/0022207 A1* | 1/2007 | Millington | 709/231 |
| 2007/0050294 A1 | 3/2007 | Trottier et al. | |
| 2007/0078876 A1* | 4/2007 | Hayashi et al. | 707/101 |
| 2007/0078883 A1* | 4/2007 | Hayashi et al. | 707/102 |
| 2007/0078898 A1* | 4/2007 | Hayashi et al. | 707/104.1 |
| 2007/0136778 A1 | 6/2007 | Birger et al. | |
| 2007/0162971 A1* | 7/2007 | Blom et al. | 726/17 |
| 2007/0192486 A1 | 8/2007 | Wilson et al. | |

OTHER PUBLICATIONS

Kay, A call for the home media network, 2002, Communications of ACM, vol. 45, pp. 5.*

* cited by examiner

COMPOSITION OF LOCAL MEDIA PLAYBACK WITH REMOTELY GENERATED USER INTERFACE

BACKGROUND OF THE INVENTION

Home entertainment networks are becoming popular and allow media stored on or accessible by a computer functioning as a media server to be presented on more traditional presentation devices, such as a television, in a separate room from the computer. In order for a television to present such media, it is often connected with a media rendering device, which in turn is connected with the computer over a home entertainment network. In addition to providing media to a remote rendering device, the computer may supply graphical components for the rendering of a user interface (UI) on the television. The media rendering device may also be a media player capable of playback of local media for presentation on the television or other presentation device. The media rendering device may display remotely generated UI components received from the computer as well as UI components generated locally by the media rendering device itself. However, there is no coordination between the UI generated at the media server and the media content presented by the media player.

SUMMARY

Functionality is provided to a media server of a home entertainment network to coordinate the presentation of a UI generated at a media server with media content sourced locally on a networked media player. The media player may be connected with a presentation device such as a television or other display device and loudspeakers for presentation of the media and the UI. The media player extracts metadata related to the media content and transmits the metadata to the media server. In response, the media server may create the UI to include components related to the media content rendered by the media player. The media server then transmits the UI to the media player for combination with the rendered media content for a composite output to the presentation device. The media server may further develop and transmit compositing instructions to the media player. The media server may additionally transmit additional media content to the media player for inclusion in the composite output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following Detailed Description of various embodiments and implementations as further illustrated in the accompanying drawings and defined in the appended claims.

DETAILED DESCRIPTION OF THE INVENTION

Figure 1:
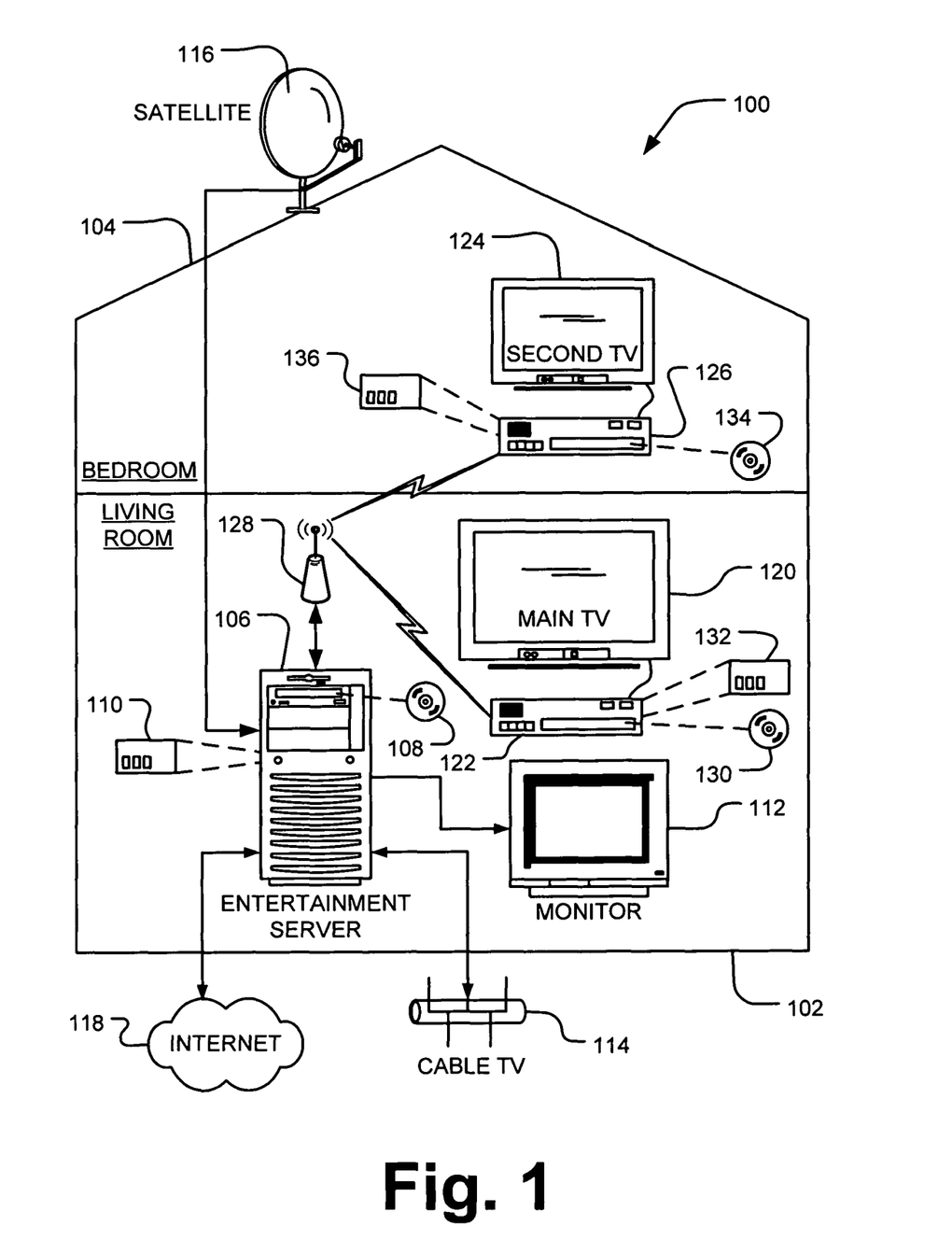
FIG. 1 is a schematic diagram of an implementation of a home entertainment environment.

Composition of a UI from a media server and media rendered locally by a media player for presentation as a composite on an attached presentation device according to implementations described herein may be understood in the context of a home entertainment network. As used herein, the terms "composite" and "composite output" are not meant to refer to the analog video format called "composite video." Instead, composite herein is meant to describe the combination or aggregation of video and UI components in a single presentation. FIG. 1 depicts an exemplary home entertainment environment 100 including a living room 102 and a bedroom 104. Central to the home entertainment environment 100 is a media server 106, in this implementation situated in the living room 102, but the media server 106 could be located anywhere within the house.

In one implementation, the media server 106 is a conventional personal computer (PC) configured to run a multimedia software package, for example, the Windows® XP Media Center Edition operating system (Microsoft Corporation, Redmond Wash.). In such a configuration, the media server 106 is able to integrate full computing functionality with a complete home entertainment system into a single PC. For example, a user can watch television (TV) in one graphical window of a display device, while sending email or working on a spreadsheet in another graphical window on the same monitor.

In addition, the media server 106 may also include other features or components, for example: a personal video recorder (PVR) to capture live TV shows for future viewing or to record the future broadcast of a single program or series; an optical disc drive 108 for compact disc (CD) or digital video disc (DVD) media playback; a memory drive 110 for integrated storage of and access to a user's recorded content, such as TV shows, songs, pictures, and home videos; and an electronic program guide (EPG).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive emails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of contents. Alternately, the user may employ an SD tuner for SD content and an HD tuner for HD content separately.

The TV content may be received as an analog signal (e.g., frequency modulated) or a digital signal (e.g., pulse code modulated) via the cable connection 114, the satellite receiver 116, or the antenna. The received TV content may include discrete content packets, where each content packet includes actual TV content (i.e., audio and video data) and a policy or policies associated with the actual TV content. If TV content is received as an analog signal, discrete content packets may be created from the analog signal.

Digital rights management (DRM) policies may be employed to protect the actual TV content or video content digitally stored on the media server 106. Licenses may therefore be associated with the actual TV or video content. A license identifies keys used to decrypt video and TV content (e.g., content packets) that are encrypted as part of DRM. In particular, the keys are used to allow consumption or use of the actual video and TV content. In certain implementations, the content packets of received TV content may be encrypted or compressed. Encrypted content packets are typically decrypted with keys transmitted to or resident at a playback device or other home network devices.

The home entertainment environment 100 may also include one or more network devices functioning as media players 122, 126 placed in communication with the media server 106 through a network 128, for example, a local area network (LAN). In an exemplary embodiment, the media players 122, 126 may be a Media Center Extender device, for example, an Xbox 360™ (Microsoft Corporation, Redmond, Wash.). The media players 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Each of the media players 122, 126 may additionally have optical disc drives 130, 134, respectively, for compact disc (CD) or digital video disc (DVD) media playback. Each of the media players 122, 126 may also have memory drives 132, 136, respectively, to allow the media player to function as a DVR. Furthermore, the media players 122, 126 may include a tuner as described above.

The network 128 may comprise a wired and/or wireless network, for example, cable, Ethernet, WiFi, a wireless access point (WAP), or any other electronic coupling means. The network 128 may enable communication between the media server 106, the media players 122, 126, and any other connected device through packet-based communication protocols, such as transmission control protocol (TCP), Internet protocol (IP), real time transport protocol (RTP), and real time transport control protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media players 122, 126. The main TV 120 and the secondary TV may be coupled to the media players 122, 126 through wireless means or conventional cables. The video monitor 112 may be coupled with the media server 106 directly via a video cable. Media content including TV content may thus be supplied to each of the video display devices 112, 120, 124 over the home network 128 from the media server 106 situated in the living room 104.

The media players 122, 126 may be configured to receive streamed media content, including video and TV content, from the media server 106. Media content, and particularly video and TV content, may be transmitted from the media server 106 to the media players 122, 126 as streaming media comprised of discrete content packets via any of the network protocols described above. The streamed media content may comprise video IP, SD, and HD content, including video, audio, and image files, decoded on the home network devices 122, 126 for presentation on the connected TVs 120, 124 or other display devices. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard remote desktop protocol (RDP), graphics device interface (GDI), or hyper text markup language (HTML).

In addition to the media players 122, 126 and the presentation devices 112, 120, 124, the media server 106 may be connected with other peripheral devices, including components such as digital video recorders (DVR), cable or satellite set-top boxes, speakers, and a printer (not shown for the sake of graphic clarity). The media server 106 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
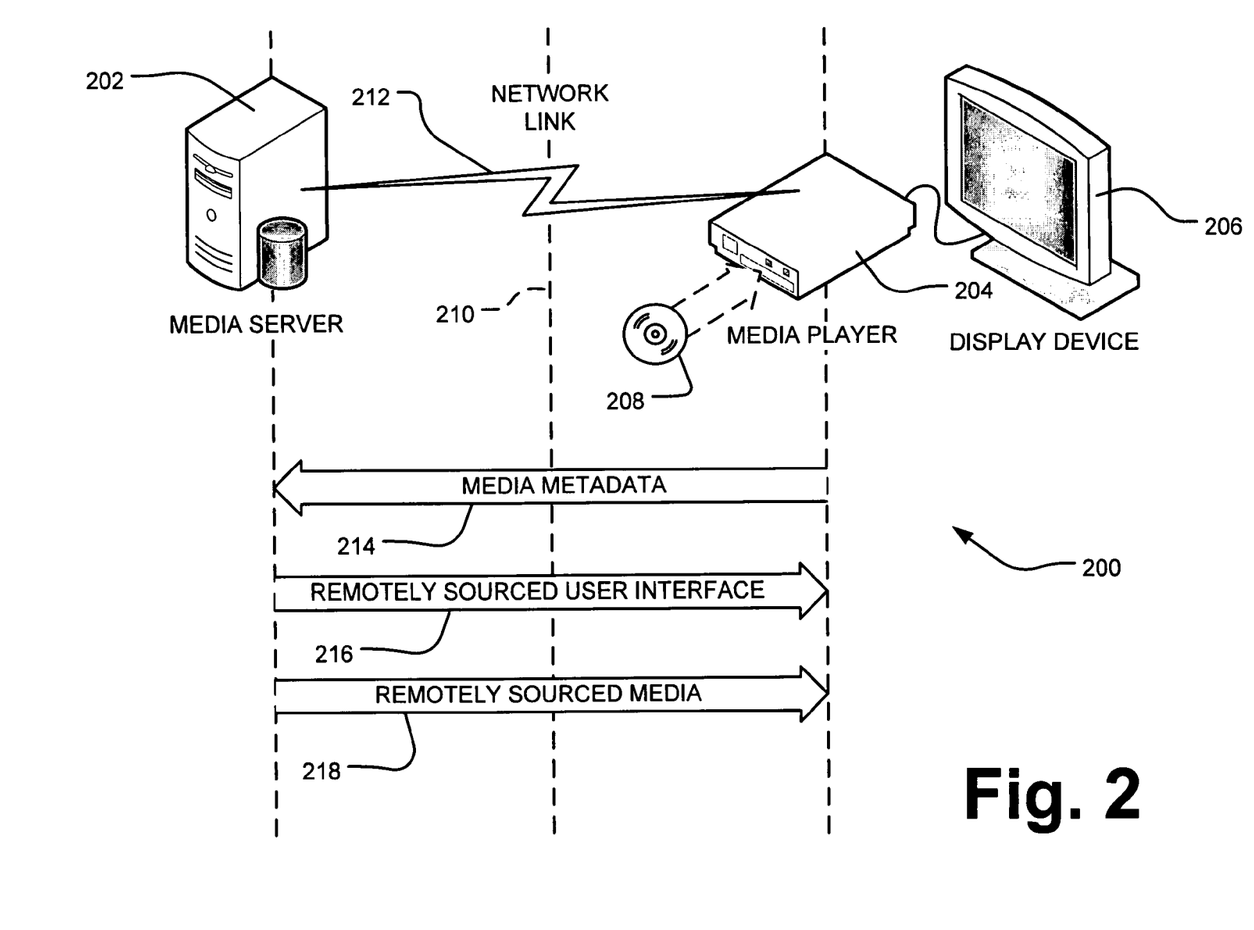
FIG. 2 is a schematic diagram of an implementation of a communication configuration between a media server and a media player.

FIG. 2 provides an overview of an implementation of a physical configuration 200 for coordinating playback of media content and presentation of user interface components, in particular audio/video content, on a media player 204 by a media server 202. As described above, the media player 204 may be connected via a network link 210 within a local network 212 (e.g., an IP network) to the media server 202. The media player 204 may have an optical disc drive 208 for compact disc (CD) or digital video disc (DVD) media playback. The media player 204 may also or alternately have a memory drive to allow the media player to function as a DVR. A presentation device 206, e.g., a television or monitor, may be connected with the media player 204 to present the media content and related UI components to the user.

As indicated in FIG. 2, the media player 204 may render media content locally from optical drive 208 or internal memory drive for playback on the presentation device 206. Metadata corresponding to the media content may be stored on the optical media or otherwise in conjunction with the media content. Such metadata information may include song or movie titles, album or movie art, closed captioning information, play/pause/stop indications, and media duration information. This media metadata 214 may be transmitted to the media server 202 via the network link 210 to be used by the media server 202 in the creation of UI related to the media content rendered by the media player 204 as further described below.

Remotely sourced UI information 216 and remotely sourced media content 218 may be transmitted from the media server 202 over the network link 210 to the media player 204. The remotely sourced UI information 216 may include, for example, menu selections, logos, an EPG downloaded by the media server 202, and graphic presentations of metadata information received from the media player 204 corresponding to the media content rendered by the media player 204. The remotely sourced UI information 216 may also include graphic presentations of metadata information about media content sourced from and transmitted by the media server 202 over the network link 210 to the media player 204. Remotely sourced media content 212 may include, for example, broadcasts of programs received and tuned by the media server 202; CD or DVD playback of music or video content by the media server 202; and music, pictures, and video stored on the media server 202.

Figure 3:
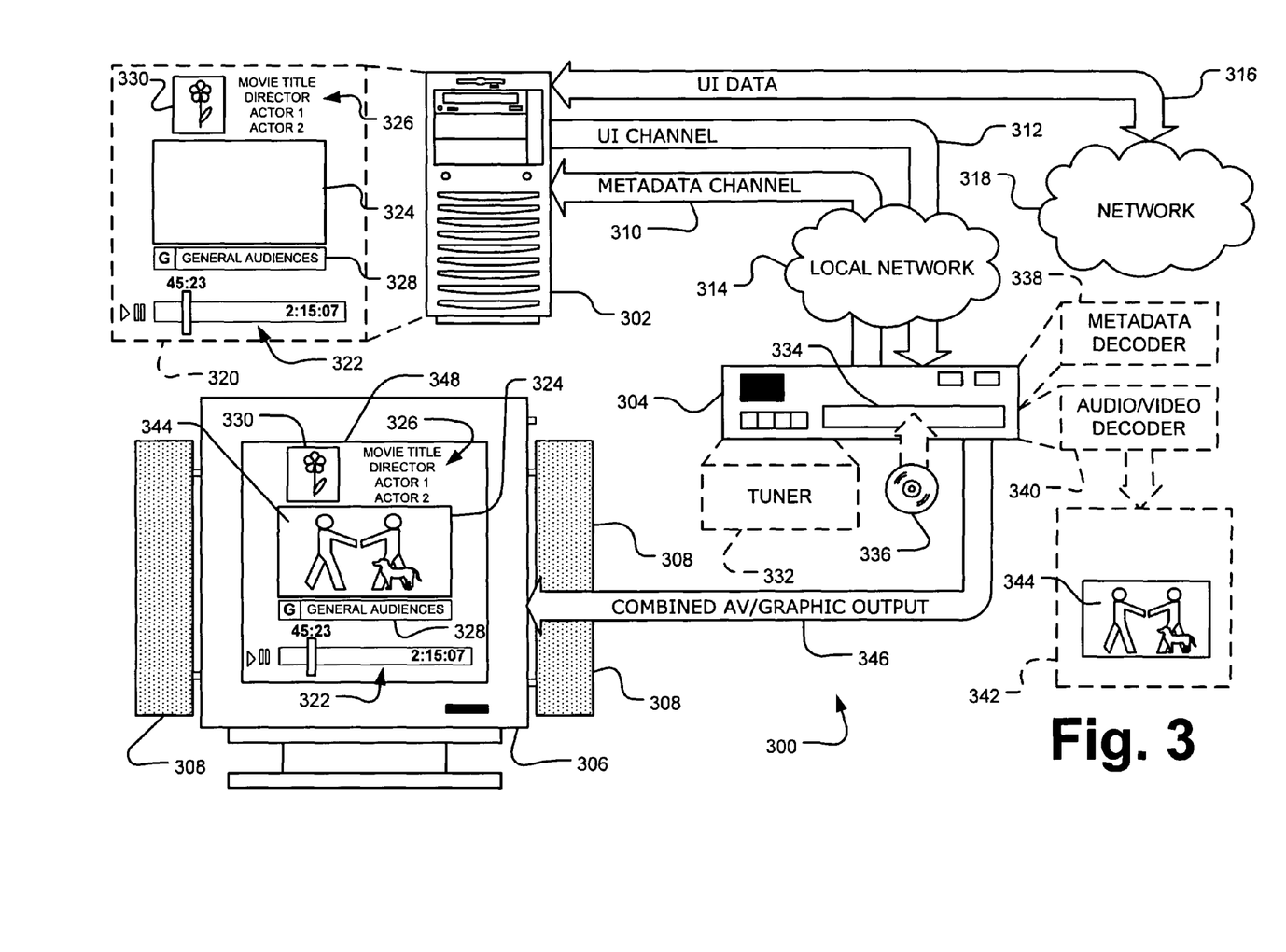
FIG. 3 is a schematic diagram of an implementation for compositing on a display device UI and graphics from a media server and media content from a media player.

FIG. 3 depicts an exemplary implementation of the composition of a remotely sourced UI framework 320 from a media server 302 with local media and UI content 342 generated at a media player 304 for output and display on a display device 306 with associated loudspeakers 308. The media server 302 and the media player 304 may be part of a home entertainment environment 300 and are connected via a local network 314. The UI framework 320 may be transmitted as a data stream from the media server 302 to the media player 304 within a UI channel 312 over the local network 314.

The media player 304 may include a tuner 332 for tuning discrete channels received via broadcast, cable, or satellite transmission. The media player 304 may alternately or further include an optical drive 334 for playback of optical media, for example, CD or DVD media 336. The media player 304 may also alternately or further include a memory drive (not depicted) for local storage of and access to media content. For playback of digital media (e.g., from optical media 336 or the memory drive, or received via broadcast and tuned by the tuner 332), the media player 304 may include an audio/video decoder 340. The audio/video decoder 340 may translate the digital media stream, which is generally digitally compressed, into analog video signals for presentation on the display device 306 and analog audio signals for presentation by the associated loudspeakers 308. Media content 344, for example, video content decoded by the audio/video decoder 340 within the media player 304, may comprise a visual portion of the local media content and UI 342. Locally generated UI, for example, volume level or other device control information for the media player 304, may also form a part of the local media and UI content 342. In alternate embodiments, the display device 306 and the loudspeakers 308 may be digital with the ability to directly render the digital audio/video signals without intermediate decoding by the audio/video decoder module 340.

The media player 304 may further have a metadata decoder module 338 for decoding metadata and other information stored and associated with the local media and UI content 342. The metadata decoder 338 may be a hardware chipset or a software program that analyzes the audio/video signal and extracts embedded data related to the local media content and UI 342. Metadata may include the name of the movie, song, or album; the length of the movie or song; names of actors, directors, or recording artists; menu information; and other information about the media content. Media playback state information, for example, play, pause, fast forward, reverse, or other playback indicators and the time elapsed in playback of the movie or song may also be processed by the metadata decoder 338 or similar module. In one implementation, the metadata decoder 338 may identify a "fingerprint" of the local media and UI content 342. The "fingerprint" may be a unique code (e.g., alphanumeric) that is universally and particularly associated with the media content (e.g., the code identifies the movie or album on the optical disk 336). The metadata identified by the metadata decoder 338 may be transmitted by the media player 304 to the media server 302 over the local network 314 in a metadata channel 310.

The remote UI framework 320 generated by the media server 302 may include elements related to the media content rendered locally by the media player 304. The elements related to the media content may be found in or based upon the metadata received at the media player 302. The remote UI framework 320 may be composed, for example, of playback information 322 at the bottom of the screen. In the example of FIG. 3 in which the media content rendered locally by the media player 304 is a movie, this playback information 322 includes play/pause indicators, the length of the movie (2 hrs., 15 min., 07 sec.), the time elapsed in playback of the movie (45 min., 23 sec.), a graphic horizontal bar indicating the relative length of the movie, and a graphic vertical bar intersecting the horizontal bar and indicating the time elapsed in playback of the movie. If the media content was only audio content, the remote UI framework 320 may alternately identify the song presently rendered for playback the name of the album, and the artist.

Additionally, the remote UI framework 320 may include a playback window 324 for positioning of the media content 344 rendered by the media player 304, a graphic or picture 330 of the cover artwork associated with the particular movie, descriptive information 326 about the movie (e.g., the title, identification of the director, and names of principal actors), and audience rating information 328 (in this example, "G" for general audiences). Content included in the remote UI framework 320 may be stored on the media server 302 and identified by the fingerprint information received in the metadata from the media player 304. Additionally or alternatively, content included in the remote UI framework 320 may be obtained by the media server 302 from outside sources via a network 318 (e.g., the Internet). For example, the cover art 330 or descriptive information 326 for the movie may be downloaded over a connection 316 with the network 318 from a remote information source. The content may be obtained by constructing a general search using the fingerprint or specific information sources may be consulted that categorize media data based upon fingerprint information.

Once the remote UI framework 320 is constructed by the media server 302, it is transmitted to the media player 304 in the UI channel 312 over the local network 314. The media server 302 may further create and transmit compositing instructions to the media player 304 in conjunction with the remote UI framework 320 to direct the media player 304 in the composition of a composite UI 348 including the local media and UI 342. The media player 304 may output the remotely generated UI 320 and the locally generated media content and UI 342 as a combined audio/visual and graphic output 346 for display as a composite UI 348 on the display device 306. The media player 304 may simply overlay the remotely generated UI 320 on top of the locally rendered media content and UI 342, possibly with the UI framework 320 and local media and UI content 342 alpha blended together. Alternatively, the media player 304 may insert the media and UI content 342 at a specific location within the remote UI framework 320, for example, within the video window 324, again possibly with the UI framework 320 and local media and UI content 342 alpha blended together.

As shown in FIG. 3, the composite UI 348 is composed of the playback information 322, the graphic or picture 330 of the cover artwork associated with the particular movie, the descriptive information 326 about the movie, the audience rating information 328 and the playback window 324. The media content 344 rendered by the media player 304 is positioned within the playback window 324. More complicated composition schemes are possible and additional implementations are considered with respect to FIG. 4 herein. The media player 304 also provides an audio output as part of the combined audio/visual and graphic output 346 for playback on the loudspeakers 308 associated with the display device 306.

In an alternative implementation (not shown) the remotely generated UI framework may be synchronized with audio only output rendered by the media player from a music disc or music files stored on the memory drive. In this example, the remote UI framework may graphically move the vertical bar of the playback information horizontally and increment the time elapsed of the song while the song plays and stop both actions when the song is paused. When the song selection changes, a display track name may be changed. Further, when the album selection changes, an album title and album picture may change in the remote UI framework component of the composite UI to reflect a different album. The song and album information may be retrieved from storage on the media server or downloaded from an external source via a network connection.

Figure 4:
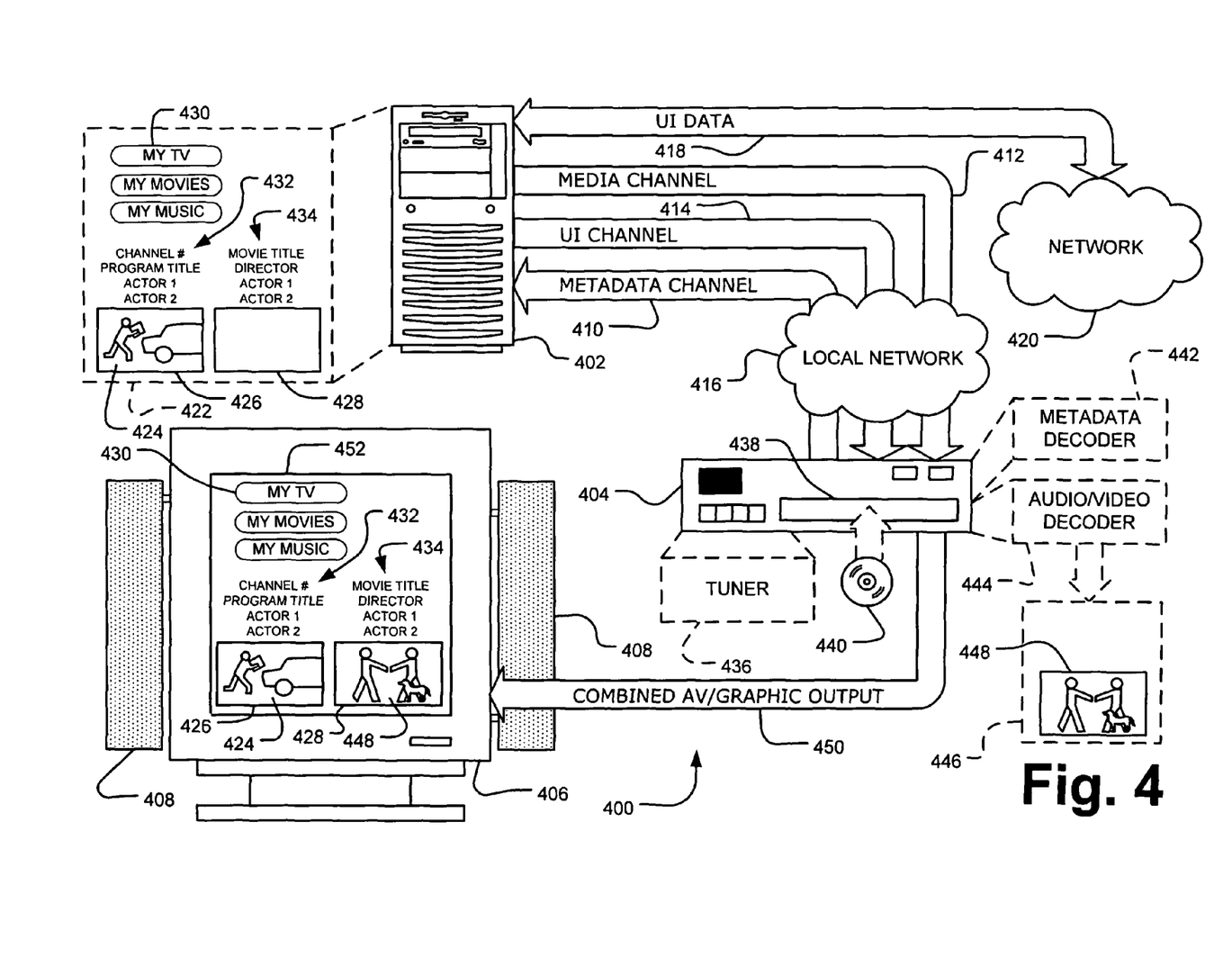
FIG. 4 is a schematic diagram of an implementation compositing on a display device UI, graphics, and media content from a media server and media content from a media player.

FIG. 4 depicts an exemplary implementation of the composition of remotely sourced audio/video media 426 and a remote UI framework 422 from a media server 402 with local media and UI content 446 generated at a media player 404 for output and display on a display device 406 with associated loudspeakers 408. The media server 402 and the media player 404 are part of a home entertainment environment 400 and are connected via a network 416. The remotely sourced audio/video media 426 generated at the media server 402 is transmitted as a data stream from the media server 402 to the media player 404 within a media channel 412 over the network 416. The remote UI framework 422 is similarly transmitted over the network 416 from the media server 402 to the media player 404 within a separate UI channel 414.

The remote UI 422 is shown as generated by the media server 402. The remote UI 422 may be composed of a first video playback window 426 at the bottom of the screen in which the remotely sourced video media 426, for example, a movie or television program, generated at the media server 402 is presented. The remote UI 422 may also provide a second video playback window 428 at the bottom of the screen in which local media and UI content 446 including media content 448, for example, a movie or television program, generated locally at the media player 402 may be presented as further described below. The remote UI 422 may further include interactive menu graphics 430 related to the software on the media server 402 for control of the home entertainment environment 400. The remote UI framework 422 may further include a first set of descriptive information 432 derived from metadata associated with the particular remotely sourced video media 426, for example, in the case of a television show, the channel, the program title, the actors, etc. The remote UI framework 422 may additionally include a second set of descriptive information 434, for example, in the case of a movie, the movie title, the actors, the director, etc., derived from metadata associated with the local media and UI content 446 rendered at the media player 404. The generation of the second set of descriptive information 434 is further described below.

The media player 404 may include a tuner 436 for tuning discrete channels received via broadcast, cable, or satellite transmission. The media player 404 may alternately or further include an optical drive 438 for playback of optical media, for example, CD or DVD media 440. The media player 404 may also alternately or further include a memory drive (not depicted) for local storage of and access to media content. For playback of digital media (e.g., from optical media 440, the memory drive, received via broadcast and tuned by the tuner 436, or received from the media server 402), the media player 404 may include an audio/video decoder 444. The audio/video decoder 444 may translate the digital media streams, which are generally digitally compressed, into analog video signals for presentation on the display device 406 and analog audio signals for presentation by the associated loudspeakers 408. Media content 448 decoded by the audio/video decoder 444 within the media player 404 may comprise a portion of the local media and UI content 446. Locally generated UI, for example, volume level or other device control information for the media player 404, may also form a part of the local media and UI content 446. In alternate embodiments, the display device 406 and the loudspeakers 408 may be digital with the ability to directly render the digital audio/video signals without intermediate decoding by the audio/video decoder module 444.

The media player 404 may further have a metadata decoder module 442 for decoding metadata stored and associated with the local media and UI content 446. The metadata decoder 442 may be a hardware chipset or a software program that analyzes the audio/video signal and extracts embedded data related to the local media and UI content 446. Metadata may include the name of the movie, song, or album; the length of the movie or song; names of actors, directors, or recording artists; menu information; and other information about the media content. Media playback state information, for example, play, pause, fast forward, reverse, or other playback indicators and the time elapsed in playback of the movie or song may also be processed by the metadata decoder 442 or similar module. In one implementation, the metadata decoder 442 may identify a "fingerprint" of the local media and UI content 446. The "fingerprint" may be a unique code (e.g., alphanumeric) that is universally and particularly associated with the local media and UI content 446 (e.g., the code identifies the movie or album on the optical disk 440). The metadata identified by the metadata decoder 442 may be transmitted by the media player 404 to the media server 402 over the local network 416 in a metadata channel 410.

The remote UI framework 422 generated by the media server 402 may include elements related to the media content rendered locally by the media player 404. The elements related to the media content may be found in or based upon the metadata received at the media player 402. The remote UI framework 422 may be composed, for example, of the descriptive information 434 about the media content 448 (e.g., the title, identification of the director, and names of principal actors). Content included in the remote UI framework 422 related to the media content 448 sourced at the media player 404 may be stored on the media server 402 and identified by the fingerprint information received in the metadata from the media player 404. Additionally or alternatively, content included in the remote UI framework 422 may be obtained by the media server 402 from outside sources via a network 420 (e.g., the Internet). For example, the descriptive information 434 for a movie may be downloaded over a connection 418 with the network 420 from a remote information source. The content may be obtained by constructing a general search using the fingerprint or specific information sources may be consulted that categorize media data based upon fingerprint information.

Once the remote UI framework 422 is constructed by the media server 402, it may be transmitted to the media player 404 in the UI channel 414 over the local network 416. The media server 402 may further create and transmit compositing instructions to the media player 404 in conjunction with the remote UI framework 422 to direct the media player 404 in the composition of a composite UI 452 including the local media and UI content 446. The remotely generated media content 424 may also be transmitted to the media player 404 in the media channel 412 over the local network 416. The media player 404 may output the remotely generated UI 422, the remotely generated media content 426, and the locally generated media and UI content 446 as a combined audio/visual and graphic output 450 for display as a composite UI 452 on the display device 406. The media player may insert the remote media content 426 and the local media and UI content 446 at specific locations within the remote UI framework 422, for example, within the first video window 426 and the second video window 428, respectively. Alternately, the remote media content 426 and the local media and UI content 446 could be presented in a picture-in-picture configuration rather than in separate windows, or in other formats as desired. The audio portion of the combined audio/video graphic output 438 may be separated for playback on the loudspeakers 408 associated with the display device 406. The audio portion may be limited to audio associated with only one of the remote media content 426 and the local media and UI content 446 based upon selection by the user.

As shown in FIG. 4, the composite UI 452 may be composed of the remote video content 424 rendered by the media player 404 positioned within the first playback window 426 and the local media content 448 rendered by the media player 404 positioned within the second playback window 428. The composite UI 452 may further include the first set of descriptive information 432 about the television show sourced at the media server 402 and the second set of descriptive information 434 about the movie source at the media player 404. More or less complicated composition schemes and additional implementations are possible.

Additionally, the composite UI 452 may include the menu graphics 430 generated as part of the remote UI framework 422. The menu graphics 430 may be altered in real time to respond to user input received at the media player 404 and transmitted to the media server 402 via the UI channel 414. In this manner, the user controls the functions of the media player 404, for example, the selection of a new movie or song stored on the media player 404. Such user input information then may be transmitted to the media server 402 to dynamically affect the generation of the remote UI framework 422, and thus ultimately the resulting composite UI 452.

Figure 5:
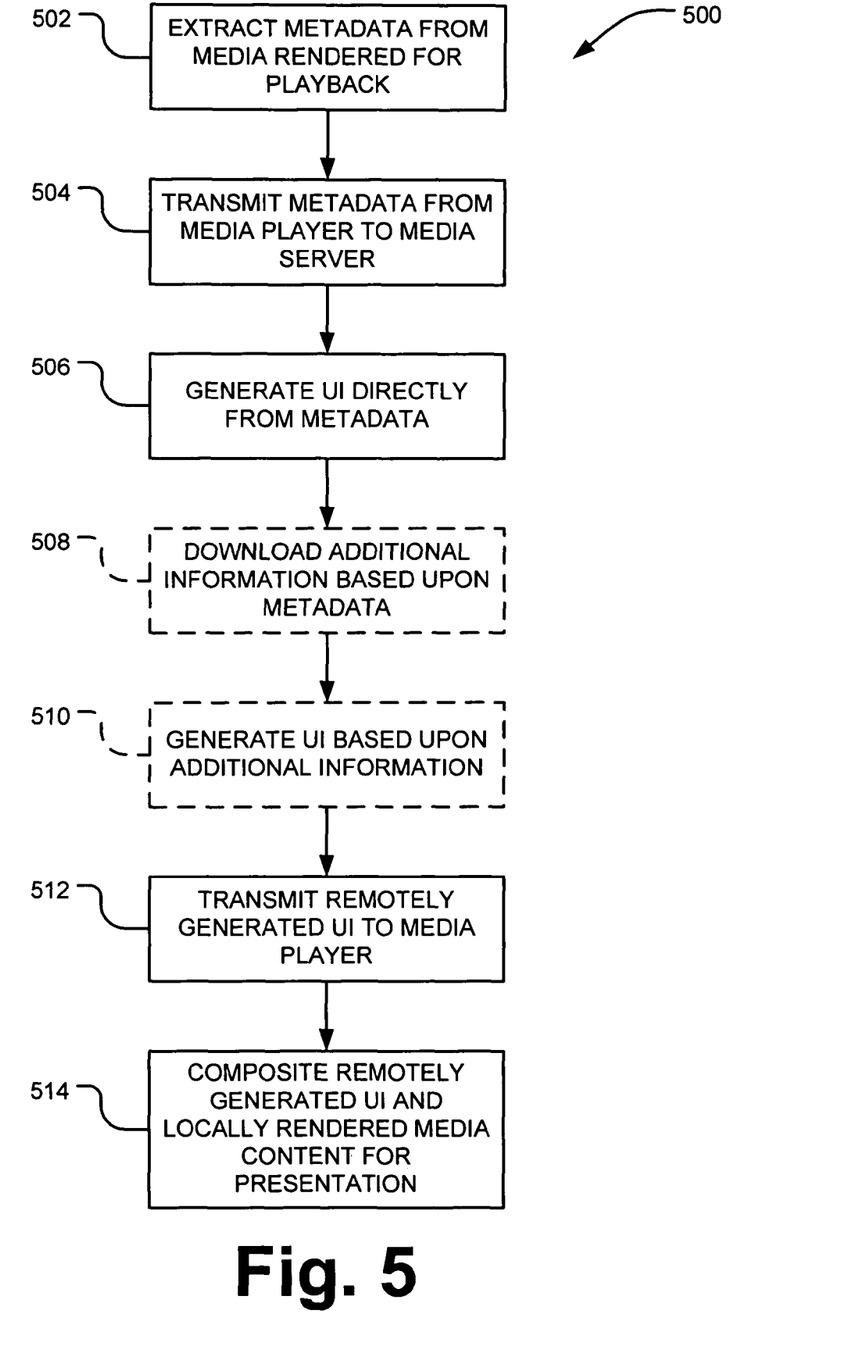
FIG. 5 is a flow diagram of an implementation of a method for compositing remotely generated UI and locally rendered media.

FIG. 5 depicts an exemplary method 500 for implementation of the remote UI and local media playback composition systems described above. Initially, in an extracting operation 502, metadata from media content rendered at a media player is parsed and decoded. Next, in a transmitting operation 504, the metadata is transmitted from the media player to the media server over the local network in the home entertainment environment. Then, in a generating step 506, the media server may create components of a UI related to the media content from the media player directly from the metadata received.

The implementation of the compositing method 500 may include additional or alternative components to the method as next described. As indicated in FIG. 5, an additional or alternate downloading operation 508 may be performed to create components of the remotely generated UI. In the downloading operation 508, additional information keyed to the metadata may be downloaded or otherwise retrieved by the media server from a source outside the local home entertainment network (e.g., from the Internet). Alternately, the media server may have a locally cached database of additional information keyed to the metadata that it can query without need to search for the information over an external network. Once the additional information is retrieved, it may be included as a component of the remotely generated UI in a generating operation 510.

The compositing method 500 may continue with a transmitting operation 512 in which the remotely generated UI is transmitted from the media server to the media player over the local network. Finally, in a compositing operation 514, the remotely generated UI is combined with the locally rendered media content at the media player for presentation on a connected presentation device.

An exemplary hardware and operating environment for implementing the systems and methods described above is depicted in FIG. 6. As indicated above, the media server and the media player devices may comprise general purpose computing devices. A general purpose computing device may be the form of a computer 600, including a processing unit 602, a system memory 604, and a system bus 618 that operatively couples various system components, including the system memory 604 to the processing unit 602. There may be only one or there may be more than one processing unit 602, such that the processor of computer 600 comprises a single central processing unit (CPU), or a plurality of processing units, commonly referred to as a parallel processing environment. The computer 600 may be a conventional computer, a distributed computer, or any other type of computer; the invention is not so limited.

Figure 6:
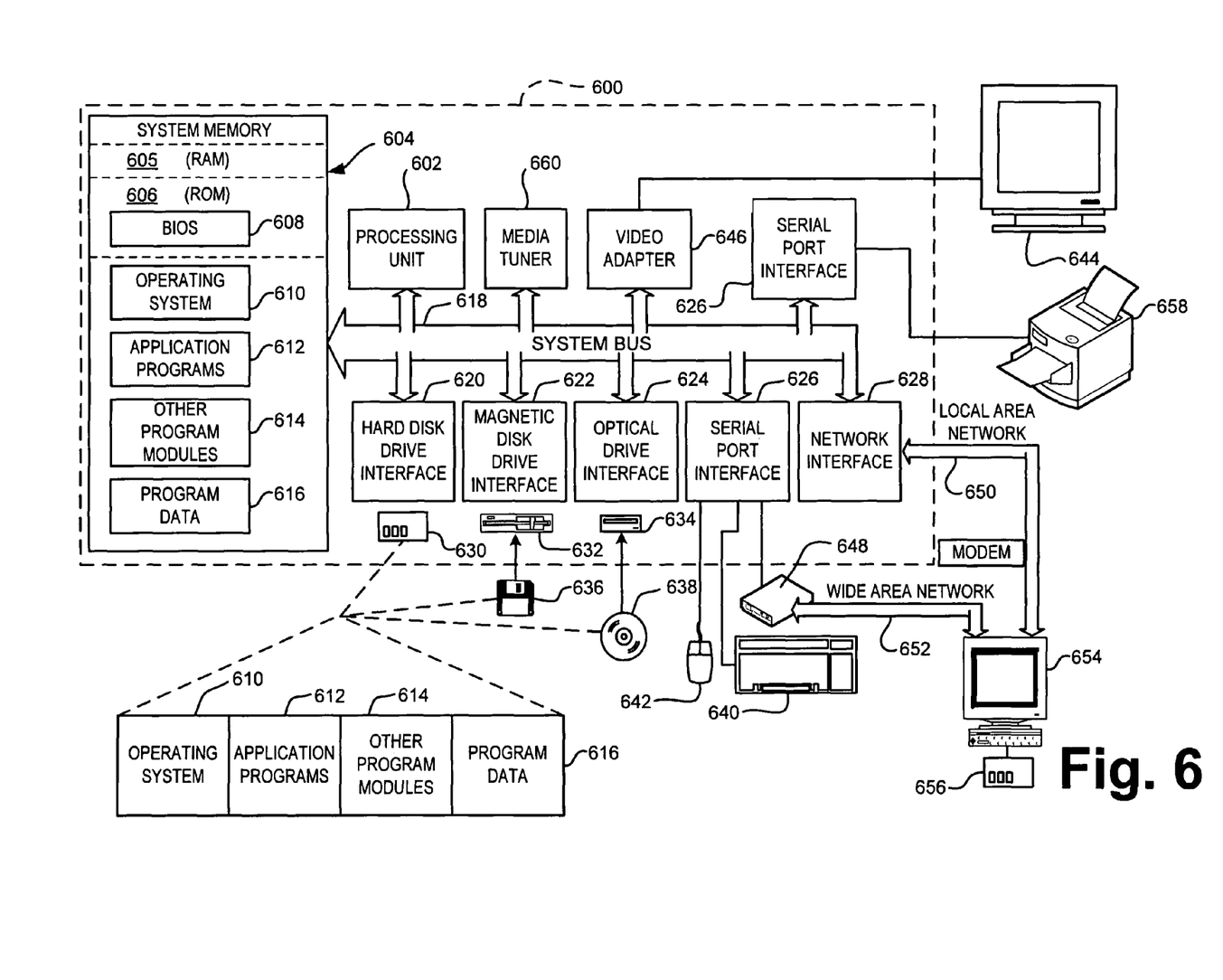
FIG. 6 is a schematic diagram of a general purpose computing system for implementing aspects of the home entertainment environment.

The system bus 618 may be any of several types of bus structures including a memory bus or memory controller, a peripheral bus, a switched fabric, point-to-point connections, and a local bus using any of a variety of bus architectures. The system memory 604 may also be referred to as simply the memory, and includes read only memory (ROM) 606 and random access memory (RAM) 605. A basic input/output system (BIOS) 608, containing the basic routines that help to transfer information between elements within the computer 600, such as during start-up, is stored in ROM 606. The computer 600 further includes a hard disk drive 630 for reading from and writing to a hard disk, not shown, a magnetic disk drive 632 for reading from or writing to a removable magnetic disk 636, and an optical disk drive 634 for reading from or writing to a removable optical disk 638 such as a CD, DVD, or other optical media.

The hard disk drive 630, magnetic disk drive 632, and optical disk drive 634 are connected to the system bus 618 by a hard disk drive interface 620, a magnetic disk drive interface 622, and an optical disk drive interface 624, respectively. The drives and their associated computer-readable media provide nonvolatile storage of computer-readable instructions, data structures, program modules, and other data for the computer 600. It should be appreciated that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 630, magnetic disk 632, optical disk 634, ROM 606, or RAM 605 including an operating system 610; one or more application programs 612, for example, a multimedia software package, other program modules 614, for example, an audio/video decoder, a UI generator, and a metadata decoder; and program data 616, for example, media content. A user may enter commands and information into the personal computer 600 through input devices such as a keyboard 640 and pointing device 642, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 602 through a serial port interface 626 that is coupled to the system bus 618, but may be connected by other interfaces, such as a parallel port, game port, or a universal serial bus (USB).

A monitor 644 or other type of display device is also connected to the system bus 618 via an interface, such as a video adapter 646. In addition to the monitor 644, computers typically include other peripheral output devices, such as a printer 658 and speakers (not shown). These and other output devices are often connected to the processing unit 602 through the serial port interface 626 that is coupled to the system bus 618, but may be connected by other interfaces, such as a parallel port, game port, or a universal serial bus (USB). In the case of a media server, a tuner 660 may also be connected with the system bus in order to receive and convert analog content signals into digital format and similarly convert digital content into analog signals for transmission to connected devices.

The computer 600 may operate in a networked environment using logical connections to one or more remote computers, such as remote computer 654. These logical connections may be achieved by a communication device coupled to or integral with the computer 600; the invention is not limited to a particular type of communications device. The remote computer 654 may be another computer, a server, a router, a network personal computer, a client, a peer device, or other common network node, and typically includes many or all of the elements described above relative to the computer 600, although only a memory storage device 656 has been illustrated in FIG. 6. The logical connections depicted in FIG. 6 include a wired or wireless local-area network (LAN) 650, for example, an Ethernet network, or a WiFi network, and a wide-area network (WAN) 652, for example, a cable network or a telephony network. Such networking environments are commonplace in office networks, enterprise-wide computer networks, intranets and the Internet, which are all types of networks.

When used in a LAN 650 environment, the computer 600 may be connected to the local network 650 through a network interface or adapter 628, which is one type of communications device. When used in a WAN 652 environment, the computer 600 typically includes a modem 648, a network adapter, or any other type of communications device for establishing communications over the wide area network 652. The modem 648, which may be internal or external, is connected to the system bus 618 via the serial port interface 626. In a networked environment, program modules depicted relative to the personal computer 600, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularly, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for combining a separately generated user interface framework and local media content for playback, the method comprising accessing local media content for playback at a media player that provides a local user interface for playback of the local media content;

accessing local user interface content at the media player for generating the local user interface;

rendering the local media content for playback in the local user interface provided by the media player;

extracting metadata related to the local media content and the local user interface content at the media player;

transmitting the metadata from the media player to a media server over a network;

generating, at the media server, remotely sourced video media content related to the local media content presently rendered for playback in the local user interface provided by the media player, the remotely sourced video media content generated based, at least in part, upon the metadata transmitted by the media player;

generating, by the media server, a remotely sourced user interface framework related to the local media content presently rendered for playback in the local user interface provided by the media player, the remotely sourced user interface framework generated based, at least in part, upon the metadata transmitted by the media player, the remotely sourced user interface framework comprising:

a first playback window for positioning the remotely sourced video media content related to the local media content presently rendered for playback in the local user interface provided by the media player within the remotely sourced user interface framework generated by the media server, and a second playback window for positioning the local media content presently rendered for playback in the local user interface provided by the media player within the remotely sourced user interface framework generated by the media server;

transmitting the remotely sourced user interface framework and the remotely sourced video media content from the media server to the media player over the network; and generating, at the media player, a composite user interface for playback of the remotely sourced video media content and the local media content at the media player, the composite user interface rendering the remotely sourced video media content for playback in the first playback window of the remotely sourced user interface framework generated by the media server and rendering the local media content presently rendered for playback in the local user interface provided by the media player in the second playback window of the remotely sourced user interface framework generated by the media server.

2. The method of claim 1 further comprising outputting the composite user interface to a presentation device.

3. The method of claim 1 further comprising transmitting compositing information for combining the remotely sourced user interface framework with the local media content presently rendered for playback in the local user interface provided by the media player from the media server to the media player.

4. The method of claim 1 further comprising transmitting the remotely sourced video media content from the media server to the media player over a local network within a media channel and transmitting the remotely sourced user interface framework from the media server to the media player over the local network within a separate user interface channel.

5. The method of claim 1, wherein:

the remotely sourced user interface framework generated by the media server further comprises a first set of descriptive information derived from metadata associated with the remotely sourced video media content and a second set of descriptive information derived from the metadata transmitted by the media player; and the remotely sourced video media content comprises a movie or television program generated at the media server that is related to the local media content.

6. The method of claim 1 wherein generating the composite user interface further comprises overlaying the local media content presently rendered for playback in the local user interface provided by the media player with the remotely sourced user interface framework generated by the media server in the composite user interface.

7. A computer-readable storage medium having stored computer-executable instructions causing a computer system to perform a computer process implementing the method of claim 1.

8. A method for combining a user interface and media content for playback that are separately generated, the method comprising receiving metadata at a media server from a media player over a network, the media player providing a user interface for playback of media content, the metadata related to media content presently rendered for playback in the user interface provided by the media player and user interface content used by the media player for generating the user interface;

generating, at the media server, video media content related to the media content presently rendered for playback in the local user interface provided by the media player, the video media content generated based, at least in part, upon the metadata received from the media player;

generating, by the media server, a user interface framework related to the media content presently rendered for playback in the user interface provided by the media player based, at least in part, upon the metadata received from the media player, the user interface framework comprising:

a first playback window for positioning the video media content related to the media content presently rendered for playback in the user interface provided by the media player within the user interface framework generated by the media server, and a second playback window for positioning the local media content presently rendered for playback in the local user interface provided by the media player within the user interface framework generated by the media server; and transmitting the user interface framework and the video media content from the media server to the media player over the network, the video media content to be rendered for playback in the first playback window of the user interface framework and the media content presently rendered for playback in the user interface provided by the media player to be rendered for playback in the second playback window of the user interface framework to generate a composite user interface at the media player for output to a presentation device.

9. The method of claim 8 further comprising generating compositing instructions for combining the user interface framework and the media content presently rendered for playback in the user interface provided by the media player; and transmitting the compositing instructions to the media player.

10. The method of claim 8 further comprising transmitting the video media content to the media player over a local network within a media channel and transmitting the user interface framework to the media player over the local network within a separate user interface channel.

11. The method of claim 8, wherein:

the user interface framework further comprises a first set of descriptive information derived from metadata associated with the video media content and a second set of descriptive information derived from the metadata received from the media player; and the video media content comprises a movie or a television program that is related to the media content presently rendered for playback in the user interface provided by the media player.

12. A computer-readable storage medium having stored computer-executable instructions causing a computer to perform a computer process implementing the method of claim 8.

13. A method for combining a user interface and media content rendered for playback that are separately generated, the method comprising accessing local media content for playback at a media player that provides a local user interface for playback of the local media content;

accessing local user interface content at the media player for generating the local user interface;

rendering the local media content for playback in the local user interface provided by the media player;

extracting metadata related to the local media content and the local user interface content at the media player;

transmitting the metadata to a media server over a network;

receiving, from the media server, remotely sourced video media content related to the local media content presently rendered for playback in the local user interface provided by the media player, the remotely sourced video media content generated at the media server based, at least in part, upon the metadata transmitted by the media player;

receiving, from the media server, a remotely sourced user interface framework related to the local media content presently rendered for playback in the local user interface provided by the media player, the remotely sourced user interface framework generated by the media server based, at least in part, upon the metadata transmitted by the media player, the user interface framework comprising:

a first playback window for positioning the remotely sourced video media content related to the local media content presently rendered for playback in the local user interface provided by the media player within the remotely sourced user interface framework generated by the media server, and a second playback window for positioning the local media content presently rendered for playback in the local user interface provided by the media player within the remotely sourced user interface framework generated by the media server; and creating, at the media player, a composite user interface for playback of the remotely sourced video media content and the local media content at the media player, the composite user interface rendering the remotely sourced video media content for playback in the first playback window of the remotely sourced user interface framework generated by the media server and rendering the local media content presently rendered for playback in the local user interface provided by the media player in the second playback window of the remotely sourced user interface framework generated by the media server.

14. The method of claim 13 further comprising outputting the composite user interface to a presentation device.

15. The method of claim 13 further comprising receiving compositing information from the media server for combining the remotely sourced user interface framework and the local media content presently rendered for playback in the local user interface provided by the media player.

16. The method of claim 13 wherein creating the composite user interface further comprises overlaying the local media content presently rendered for playback in the local user interface provided by the media player with the remotely sourced user interface framework generated by the media server in the composite user interface.

17. The method of claim 13 further comprising receiving the remotely sourced video media content from the media server over a local network within a media channel and receiving the remotely sourced user interface framework from the media server over the local network within a separate user interface channel.

18. The method of claim 13, wherein:

the remotely sourced user interface framework generated by the media server further comprises a first set of descriptive information derived from metadata associated with the remotely sourced video media content and a second set of descriptive information derived from the metadata transmitted by the media player; and the remotely sourced video media content comprises a movie or a television program generated at the media server that is related to the local media content.

19. The method of claim 13 further comprising receiving compositing instructions from the media server for combining the remotely sourced user interface framework generated by the media server, the local media content presently rendered for playback in the local user interface provided by the media player, and the remotely sourced media content.

20. A computer-readable storage medium having stored computer-executable instructions causing a computer to perform a computer process implementing the method of claim 13.

* * * * *